United States Patent [19]
Kost

[11] Patent Number: 5,867,112
[45] Date of Patent: Feb. 2, 1999

[54] SOFTWARE METHOD OF COMPRESSING TEXT AND GRAPHIC IMAGES FOR STORAGE ON COMPUTER MEMORY

[76] Inventor: James F. Kost, 900 Ogden Ave. #22, Downers Grove, Ill. 60515

[21] Appl. No.: 856,426

[22] Filed: May 14, 1997

[51] Int. Cl.$^6$ .................................................. H04N 1/00
[52] U.S. Cl. ............................................. 341/51; 358/528
[58] Field of Search .................................. 341/50, 51, 65, 341/67; 358/528, 400

[56] References Cited

U.S. PATENT DOCUMENTS

| | | | |
|---|---|---|---|
| 4,992,862 | 2/1991 | Gabor | 358/76 |
| 5,410,415 | 4/1995 | Parulski et al. | 358/403 |
| 5,444,552 | 8/1995 | Smith, III | 358/465 |
| 5,528,293 | 6/1996 | Watanabe | 348/231 |
| 5,675,507 | 10/1997 | Bobo, II | 364/514 R |

OTHER PUBLICATIONS

"Huffman Coding", Dec. 23, 1994, D.A. Huffman.

Primary Examiner—Howard L. Williams
Assistant Examiner—Pegoy JeanPierre
Attorney, Agent, or Firm—Hamman & Benn

[57] ABSTRACT

A method of compressing text and graphic images for storage on a computer memory device. The first step of the invention is the importation of a TIFF or EPS file to be compressed into a conversion program where it is converted to a JPEG or PICT filt type. The next step is to import the converted file into a basic authoring program that is written to allow importation of JPEG or PICT files. Once the file has been inserted into the authoring program, a standard compressor is selected and used to perform compression, such compressors being preferably "CINEPAK" of JPEG. Once the file-images have been compressed to a level desired, the images are then stored or fixed or transmitted in their compressed form in their new file-type. The next step is the decompression of the file-images and the viewing thereof. When the compressed file is selected for viewing, a decompression and conversion program is run to decompress the file and convert it back into its original file-type, TIFF or EPS, at which time, it may be processed by an OCR program.

16 Claims, 1 Drawing Sheet

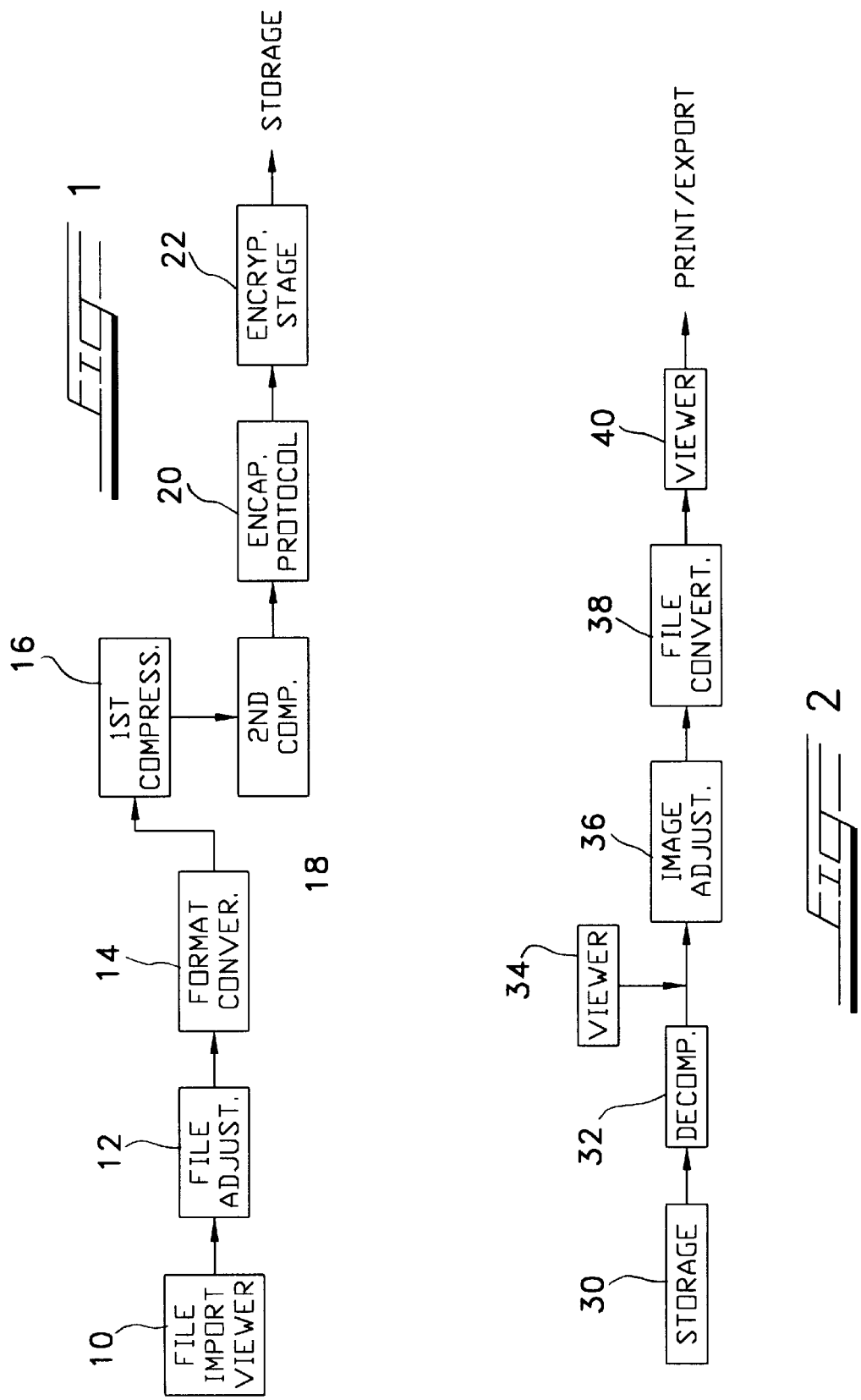

SOFTWARE METHOD OF COMPRESSING TEXT AND GRAPHIC IMAGES FOR STORAGE ON COMPUTER MEMORY

BACKGROUND OF THE INVENTION

The present invention is directed to a method of using software for compressing graphic images in order that these graphic images may be stored in a substantially enhanced compressed mode on a computer memory. The present invention has especial use in all areas of archiving, such as banks, libraries, insurance companies, and the like, where the prodigious amount of data generated has hithertofore precluded, or made difficult, the transferrance of the physical copies to digital data for storage on a computer memory device. Presently, for example, in the banking industry, the records of al transactions, checks, and the like, are presently stored on microfiche, which is a costly and time-consuming operation, and which, also, requires considerable time in actual use when a check or a transaction is required to be located. Because current computer compression techniques are not capable of compressing data to a degree necessary for storing such prodigious amounts of information, computer-storage of these files has not been implemented to any great degree.

The technological process of the invention involves converting certain text and image file-types, which hitherto have been difficult or impossible to compress, into file-types that can be compressed using standard compression techniques. Thereafter, these compressed files may be decompressed and converted back into their original form for viewing, or converted into a special file-format.

Images are usually imported into computer programs by means of scanners and databases. These data-bases are in either TIFF (Tag Image File Format) or EPS (Encapsulated PostScript Language) format. TIFF files are usually text files stored as a 1 or 2-bit, B&W file. This is a file format frequently used for fax-transmissions and scanning-applications to store or send images as bit maps in various sizes, resolutions, or color depths. It is considered a low-quality, imaging file-type as compared to other file-types available. It's popularity and subsequent broad utilization, however, has been attributed to its versatile file-architecture, which stores information in "tagged fields." This allows application programs to use these "tags" by accepting or ignoring fields within the file, depending on the program's capabilities, and, is, therefore, easily adapted for use by standard faxing or scanning equipment. Presently, TIFF files can be compressed to a lower file size only using the patented LZW compression algorithm (after Lempel-Ziv and Welch, the inventors), as disclosed in U.S. Pat. No. 4,558,302. This compression-algorithm uses the Unix compress-command to reduce the size of files, e.g. for archival or transmission. There are several variants of Lempel-Zev compression schemes, which include LZ77, LZ78, LZSS, LZFG, LZB and LZH (after Lempel-Ziv and Haruyasu, the inventors), for example. While there are several compression-schemes available to reduce TIFF file size, the most popular include LZW, LZW with prediction, Pack Bits (RLE), CCITT (International Telegraph and Telephone consultative Committee Study Group) -Level 3, and -Level 4. In each of these processes, however, the deterioration of the subsequent decompressed file is quite noticeable, and, in certain circumstances, the compression ratios of the file-reduction is minimal as compared to the compression ratios of the present invention.

EPS file-formats are extremely high-quality image files used predominantly in the Desktop Publishing Industry. This file-type uses a combination of Post-Script commands and TIFF or PICT formats. PICT files, developed by Apple Computer in 1984, are encoded in "QUICKDRAW" commands, and can hold both object-oriented images and bit-mapped images. Due to the large amount of information relating to the image characteristics, i.e., size, resolution, brightness, color depth, etc., compression-algorithms available for this file-type are presently limited.

SUMMARY OF THE INVENTION

It is, therefore, the primary objective to provide a method of compressing text and graphic images for storage on a computer memory device.

It is another objective of the present invention to provide such a method of compressing whereby the compression ratio achieved is considerably greater than those of other compression techniques.

Toward these and other ends, the first step of the invention is the importation of the file to be compressed into a conversion program where it is converted to a JPEG or PICT file-type. At this point, the file-size, color-depth, canvas-size, and other related characteristics are maintained. The only change to the file is its file type. The next step is to import the converted file into a basic authoring program that is written to allow import of JPEG or PICT files either individually or as a batch. Once the file has been inserted into the authoring program, a standard compressor is selected and used to perform compression, such compressors being, for example, "CINEPAK", "INDEO", Video for "WINDOWS", etc. Once the file-images have been compressed to a level desired, the images are then stored or faxed or transmitted in their compressed form in their new file-type. The next step is the decompression of the file-images and the viewing thereof. When the compressed file is selected for viewing, a decompression and conversion program is run to decompress the file and convert it back into its original file-type, TIFF or EPS, at which time, it may be processed by an OCR program. This basically turns the image-file into a text-file allowing "key word" search engines to selected, desired passages within the file.

BRIEF DESCRIPTION OF THE DRAWINGS

The invention will be more readily understood with reference to the accompanying drawing, wherein:

FIG. 1 is a block diagram showing the method steps of compressing the files according to the invention; and FIG. 2 is a block diagram showing the method steps of decompressing and viewing the files.

DETAILED DESCRIPTION OF THE INVENTION

According to the invention, as shown in FIG. 1, in order to compress any still-image file, the first step is to first acquire, or import, the still-image directly into the microcomputer by conventional means, such as by scanning, fax transmission, copying, etc. (Box 10 in FIG. 1). This, then, must be made visible and selectable by the computer by means of a "viewer." Once the file can be accessed by the user through a viewer which supports the file-format involved, the file can be opened and subsequently converted using standard, string-processing language which combines the pattern matching and transformation operations common to bi-level graphics file-types. The original file is in ASCII or binary format, for example, TIFF. Since video compressors cannot read TIFF files, the file format must be changed to one which the video compressor can read, such as to a JPEG or PICT file-type; thus, the need for the file adjustments. Since TIFF files and the like, for example, are 1 or 2-bit, and JPEG or PICT files are 8-bit, the header of the TIFF file, or the like, is adjusted to indicate an 8-bit file. Similar changes are made to the header of the TIFF file for other attributes, such as an adjustment in the header from B&W to color, and the like, so that the header takes on the file-type of JPEG or PICT; that is, in order to convert certain, unique file-types to a common file-type, which can be compressed using standard compression algorithms, there are often required some key adjustments within the file-structure itself (Box 12 in FIG. 1). These adjustments include changing low-bit images to at least 8-bit or higher, because, in order to use certain standard graphic compressions, an 8-bit file structure or higher is often required. Other changes which may be implemented at this point involve making transformations of 1-bit images to grayscale levels, CMYK color to RGB color depths, the changing of pixmap information which may include changing the X-Y resolution levels (low DPI to a higher DPI setting), the adjusting of the color balance, the rotation of the image if necessary, the adjusting of the curves, the inversion of the image, the adjustment of brightness and contrast of the image, and possibly the size of the image itself, all of which is accomplished by adjustments to the header of the file. These adjustments are made for an important reason. They cause the resolution to be successively doubled or intentionally increased to allow bi-level pixel encoding into symbols which can be then used for file-reduction using the probability of occurrence of these symbols in a certain context, in accordance with Huffman encoding principals, and also in accordance with Q-Coder Compression Methods—Joint Bi-Level Image Experts Group of ISO, IEC, and CCITT, JTCV1/SC2/WG9 and SGVIII.

The next step is to perform a conversion using conventional techniques into one or more of the easily compressible file-types which include JPEG, PICT or PCX type-files (Box 14). Then, standard, file compressors (Boxes 16, 18) may then be imposed at this point include, such as "CINEPAK", "INDEO", graphics, animation, video, JPEG A and B, Photo JPEG, MPEG, JBIG, CDI, DVD, etc. The selection of the standard compressor-type is directly dependent on the quality of the image in its decompressed form and the file-size desired. According to the preferred embodiment of the invention, for best compression and file-reduction, it is recommended that either JPEG, such as Photo-JPG, or "CINEPAK" which is the compressor for "QUICKTIME", be imposed twice on the same file. These two video compressors are preferred, since, in accordance with the preset invention, they allow for double compressions to be imposed on the file, whereas other compressors, such as MPEG, do not. This method of double compression, using the same compressor, results in a substantially reduced file-size. The reason for this is two-fold. The first compression produces a significant file-reduction by assigning short codes to frequently occurring characters and longer codes to infrequently occurring characters. With Huffman's redundancy encoding, the average number of bytes is minimized. With the second compression on the same file, a form of Dynamic Huffman Encoding is implemented reading each text twice, once to determine the frequency distribution of the characters in the text and once to encode the data. The final codes used for compression are then computed on the basis of the statistics gathered during the first pass with compressed texts being prefixed by a copy of the Huffman encoding lookup tables for use with the decoding process.

The significance of the process of the invention is that one can take practically any binary or ASCII file-type, which may or may not have a compression scheme available for it, and convert it to a format that has a number of highly-efficient compression algorithms available for file-reduction. The various file-formats which may be converted according to the invention to a compressible file-type, compressed, then decompressed, and converted back to its original file-type include the following: XWD, XPM, SBM, WMF, TRS-80, TIFF, TGA, SCITEX, Sun-Raster Files, STAD, Softimage, SGI, RTF, RAW, PSD, PPAT, PNG, PICT in Resource, PICT, PICS in PICT Sequence, PCI for PSION, PCS/SCR, PBM/PGM/PPM, MOOV-Quicktime Movie (MOV), MAC Paint, JPEG/JFIF, IMG/SIMG, Photoshop, PDF, IFF/LBM/HP-GL/Z, GIF, EPSF, BMP, and ASCII. In some wordprocessing programs, interim conversion-steps may be required, such as taking a WPD program and converting it to a Rich Text Format (RTF) before it is converted to a compressible image file.

A major feature of this type of compression-process is that the completed images may be further compressed (Box 20) using such popular encapsulating protocols known as "STUFF-IT" (Aladdin Industries) and "ZIP-IT" (Shannon-Fano Coding—Zip1.x). With these programs, an additional 10–20% reduction of the compressed file can be achieved.

In security applications, these compressed files can be encrypted (Box 22) using well-known Level-1 through Level-5 encryption schemes for varying levels of security. When encryption is imposed on the final file, it becomes totally dissimilar to any known file-type, allowing a special, file-extension designation to be register. At this point, the finished filed becomes totally unique with its own identification.

Once an image file is compressed and stored (Box 30, FIG. 2), the same, standard compression-technique can be used to decompress the file (Box 32) for viewing through a viewer which supports that file-type (Box 34), or converted back into its original form (Boxes 34, 36) for conventional viewing (Box 38). The significant element here is that, in most cases, the standard compression-technique used to compress the image file can be varied in so far as to the level of compression and quality desired. This contrasts with such compressions as LZW or CCITT compressors where there is little control over the amount of compression and image-quality of the finished file. The finished file-type can be easily incorporated into an existing FAX program or Archival Program. If transmitted to another user, the reduced file-size minimizes transmission times. If used to store files in an Archival Application, the resulting reduction of storage area significantly enhances the value of the application itself.

One of the significant aspects of this technology is that this process of conversion, compression, decompression, and re-conversion functions irrespective of the operating system platform being used, i.e., DOS, UNIX, etc. In the preferred embodiment, the method steps detailed above are performed on a MaCintosh computer. Since the basic file-types are either Binary or ASCII in their structure, conversion, or flattening, between operating platforms and subsequent file-types involved is easily achieved. For example, in the case of flattening for a PC, the parallel "Source" and "Locator" forks of the compressed file are converted into a series of "Source" and "Locator" forks which is readable by a PC. This "flattening" is done at each compression step 16, 18. This means that, as algorithms, operating systems, applications and their file-types evolve, this methodology or processing of the invention may be used to take advantage of continued improvements in file-compression, or be adapted to any application, or be in compliance with any standard which may be developed in the future.

While specific embodiments of the invention have been shown and described, it is to be understood that numerous changes and modifications may be made therein without departing from the scope, spirit and intent of the invention as set forth in the appended claims.

What I claim:

1. A method of compressing image and/or text files on a computer, comprising:

(a) storing the image and/or text files in the memory of a computer in ACSII or binary code in a first file format that is not readily compressible;

(b) converting the image and/or text file into) a second file format that is readily compressible using file-conversion software; and (c) after said step (b), compressing the converted second file format using a compressor at least one time;

(d) said step (b) comprising adjusting the header of said first file format of the image and/or text file of said step (a) in order to enable the file-conversion software used in said step (b) to read the file, said step (d) comprising adjusting the header of said first file format by changing the characteristics of the file-header to at least one of the following: at least an 8-bit image or higher, gray-scale levels, RGB color depths, higher DPI setting, rotation of image, inversion of image, size of the image, brightness of image, and contrast of image.

2. The method of compressing image and/or text files on a computer, according to claim 1, wherein before said step (a), importing the image and/or text into a memory of a computer, said step of importing comprises performing at least one of scanning, copying, and faxing the image and/or text data to be stored in memory.

3. The method of compressing image and/or text files on a computer, according to claim 1, wherein said step (a) comprises storing the image and/or text data in at least one of TIFF and EPS file-format; said step (b) comprising converting said at least one TIFF and EPS file-format into at least one of JPEG, PICT, and PCX file-format.

4. The method of compressing imaged and/or text files on a computer, according to claim 1, wherein said step (c) comprises compressing the image and/or text file using at least one video compressor.

5. The method of compressing image and/or text files on a computer, according to claim 4, wherein said step (c) comprises using at least one of "CINEPAK" and JPEG.

6. The method of compressing image and/or text files on a computer, according to claim 1, wherein said step (c) comprises compressing the image and/or text file at least two times in succession.

7. The method of compressing image and/or text files on a computer, according to claim 6, wherein said step (c) comprises flattening the image and/or text file between each step of compressing for allowing playback of the image and/or text file on all computer operating systems.

8. The method of compressing image and/or text files on a computer, according to claim 1, further comprising:

(d) after said step (c), encrypting the converted image and/or text file for storage in the memory of a computer.

(e) viewing the decompressed file on a computer.

9. The method of compressing image and/or text files on a computer, according to claim 1, further comprising:

(d) decompressing the compressed and converted image and/or text file using at least one of the compressors used in said step (c); and (e) viewing the decompressed file on a computer.

10. The method of compressing image and/or text files on a computer, according to claim 9, wherein said step (e) comprises adjusting the file header of the decompressed file, and converting the file into a format that is usable by a player of the computer.

11. A method of decompressing an image and/or text file on a computer, which file has been compressed by first converting the image and/or text file from a first file format that is not readily compressible into a second file format that is readily compressible using file-conversion software, and compressing the converted second file format using a compressor at least one time, comprising:

(a) decompressing the file in its second file format;

(b) changing the header of the file in its second file format of the image and/or text file to the header of said first file format in order enable the reading of said first, original file, said step (b) comprising adjusting the header of said file in its second file format by changing the characteristics of the file-header to at least one of the following: at least a 1 or 2-bit image, CMYK color, lower DPI setting, rotation of image, inversion of image, size of the image, brightness of image, and contrast of image.

12. A method of compressing and decompressing an image and/or text file on a computer, comprising:

(a) storing the image and/or text file in the memory of a computer in ACSII or binary code n a first file format that is not readily compressible;

(b) converting the image and/or text file into a second file format that is readily compressible using file-conversion software; and (c) after said step (b), compressing the converted file in the second file format using a compressor at least one time;

(d) said step (b) comprising adjusting the header of the file in its first file format of the image and/or text file of said step (a) in order enable Lhe file-conversion software used in said step (b) to read the file, said step (d) comprising adjusting the header of said first file format by changing at least one characteristic of the file-header;

(e) decompressing the file in its second file format using the compressor of said step (c) at least one time, (f) and re-converting the header of the file in its second file format back to the header of said first file format, said step (f) comprising adjusting the header of said second file format by changing the at least one characteristic of the file-header changes during said step (d).

13. The method of compressing and decompressing an image and/or text file on a computer, according to claim 12, wherein said step (c) comprises compressing the file in its second file format at least two times using at least one file compressor software.

14. The method of compressing and decompressing an image and/or text file on a computer, according to claim 12, wherein said step (c) comprises compressing the file in its second file format at least two times using two different file compressor software processes.

15. The method of compressing and decompressing an image and/or text file on a computer, according to claim 12, wherein said step (e) comprises decompressing the file in its second file format at least two times using at least one file decompressor software.

16. The method of compressing and decompressing an image and/or text file on a computer, according to claim 12, wherein said step (e) comprises decompressing the file in its second file format at least two times using two different file decompressor software processes.

* * * * *